US009081093B2

(12) United States Patent
Willis (10) Patent No.: US 9,081,093 B2
(45) Date of Patent: Jul. 14, 2015

(54) PROCESSING SAR IMAGERY

(75) Inventor: Christopher Jon Willis, Chelmsford (GB)

(73) Assignee: BAE SYSTEMS plc, London (GB)

( * ) Notice: Subject to any disclaimer, the term of this patent is extended or adjusted under 35 U.S.C. 154(b) by 204 days.

(21) Appl. No.: 13/821,774

(22) PCT Filed: Sep. 7, 2011

(86) PCT No.: PCT/GB2011/051669
§ 371 (c)(1),
(2), (4) Date: Mar. 8, 2013

(87) PCT Pub. No.: WO2012/035315
PCT Pub. Date: Mar. 22, 2012

(65) Prior Publication Data
US 2013/0170708 A1 Jul. 4, 2013

(30) Foreign Application Priority Data

Sep. 17, 2010 (EP) ...................................... 10251613
Sep. 17, 2010 (GB) ...................................... 1015547.1

(51) Int. Cl.
*G01S 13/88* (2006.01)
*G01S 13/90* (2006.01)

(52) U.S. Cl.
CPC *G01S 13/88* (2013.01); *G01S 13/90* (2013.01)

(58) Field of Classification Search
CPC .......... G06K 9/00496; G06K 9/00503; G06K 2209/21; G06T 2207/10044; G01S 13/88; G01S 13/89; G01S 13/90; G01S 13/9035
USPC ...... 382/103, 218, 221; 342/25 R, 25 B, 25 F
See application file for complete search history.

(56) References Cited

U.S. PATENT DOCUMENTS 4,914,734 A * 4/1990 Love et al. ...................... 342/64
6,894,639 B1 * 5/2005 Katz ............................... 342/90

FOREIGN PATENT DOCUMENTS

| CN | 101833093 A | 9/2010 | ............. G01S 13/90 |
| JP | 2005-083909 A | 3/2005 | ............. G01S 13/90 |
| JP | 2010-175330 A | 8/2010 | ............. G01S 13/90 |

OTHER PUBLICATIONS

Rosario, Dalton S., "Simultaneous Multitarget Detection and False Alarm Mitigation Algorithm for the Predator UAV TESAR ATR System", Image Analysis and Processing (1999), Proceedings of International Conference on Venice, Italy, Sep. 27-29, 1999, pp. 577-581.

(Continued)

*Primary Examiner* — Andrew W Johns
(74) *Attorney, Agent, or Firm* — Scully, Scott, Murphy & Presser, PC (57) ABSTRACT

A method and apparatus (1) for processing SAR imagery data, comprising: determining variance ratio data from the SAR imagery data; and processing, for use in change detection, the determined variance ratios data by making use of the F-distribution. The method may further comprise selecting a desired false alarm rate; and wherein making use of the F-distribution comprises determining a change detection threshold for the determined variance ratios data that is dependent upon the F-distribution and the desired false alarm rate. Another possibility is that making use of the F-distribution comprises using the F-distribution to determine probabilities for the determined variance ratios data.

11 Claims, 11 Drawing Sheets

(56) References Cited

OTHER PUBLICATIONS

Villasenor, John D., et al., "Change Detection on Alaska's North Slope Using Repeat-Pass ERS-1 SAR Images", IEEE Transactions on Geoscience and Remote Sensing (Jan. 1993), vol. 31, No. 1, pp. 227-236.

Cerutti-Maori, D. et al., "Experimental Verification of SAR-GMTI Improvement Through Antenna Switching", IEEE Transactions on Geoscience and Remote Sensing (Apr. 2010), vol. 48, No. 4, pp. 2066-2075.

Gierull Christoph H. et al., "Statistics of SAR Interferograms with Application to Moving Target Detection", Technical Report, DREO TR 2001-045 (Jul. 2001), pp. 1-65.

Li, Jian et al., "Target Detection with Synthetic Aperture Radar", IEEE Transactions on Aerospace and Electronic Systems (Apr. 1996), vol. 32, No. 2, pp. 613-627.

Kaplan, Lance M., "Improved SAR Target Detection via Extended Fractal Features", IEEE Transactions on Aerospace and Electronic Systems (Apr. 2001), pp. 436-451.

International Search Report and Written Opinion dated Dec. 7, 2011 issued in PCT/GB2011/051669.

Extended European Search Report dated Feb. 22, 2011 issued in EP 10251613.5.

UK Search Report dated Jan. 7, 2011 issued in GB1015547.1.

International Preliminary Report on Patentability together with the Written Opinion dated Mar. 28, 2013 received in related International Application No. PCT/GB2011/051669.

* cited by examiner

PROCESSING SAR IMAGERY

FIELD OF THE INVENTION

The present invention relates to the processing of Synthetic Aperture Radar (SAR) imagery. The present invention relates in particular to processing variance ratios of SAR imagery for the purpose of change detection.

BACKGROUND

It is known to process or calculate variance ratios of Synthetic Aperture Radar (SAR) imagery for the purpose of change detection.

In the general field of variance ratio processing, it is known to process/analyse data in terms of the F-distribution. However, conventionally, processing/analysing data in terms of the F-distribution is not considered for variance ratios derived from SAR imagery. For SAR imagery, the actual data is Gamma distributed. Therefore the variance of SAR imagery does not have a ready theoretical form. Likewise the ratio of the variances again does not have a ready theoretical form, and hence the F-distribution is not straightforwardly applicable.

SUMMARY OF THE INVENTION

The present invention is derived at least in part from the inventor alighting on an aspect that the Gamma distribution tends to a Gaussian distribution at the extreme of parameterisation, and then realising ways in which this can surprisingly be developed leading to use of the F-distribution for SAR imagery variance ratio data.

In a first aspect, the present invention provides a method of processing SAR imagery data, the method comprising: determining variance ratio data from the SAR imagery data; and processing, for use in change detection, the determined variance ratios data by making use of the F-distribution.

The method may further comprise selecting a desired false alarm rate; and making use of the F-distribution may comprise determining a change detection threshold for the determined variance ratios data that is dependent upon the F-distribution and the desired false alarm rate.

Determining the change detection threshold using the F-distribution may comprise using the inverse cumulative density function of the F-distribution.

Determining the change detection threshold using the F-distribution may comprise using the equation $$t = F^{-1}\left(\frac{p_{fa}}{2} \middle| \frac{N-1}{\varphi(L,N)}, \frac{N-1}{\varphi(L,N)}\right).$$

The method may further comprise comparing the determined variance ratios data to the determined change detection threshold.

The determined variance ratios data may be an image of ratio values.

Making use of the F-distribution may comprise using the F-distribution to determine probabilities for the determined variance ratios data.

Determining the probabilities using the F-distribution may comprise using the equation $$p = 2F\left(r \middle| \frac{N-1}{\varphi(L,N)}, \frac{N-1}{\varphi(L,N)}\right).$$

The probabilities may be determined for each pixel or local area window used in the determination of the variance ratios data.

In a further aspect, the present invention provides apparatus arranged to perform the method of any of the above aspects.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the above aspect.

DETAILED DESCRIPTION

Figure 1:
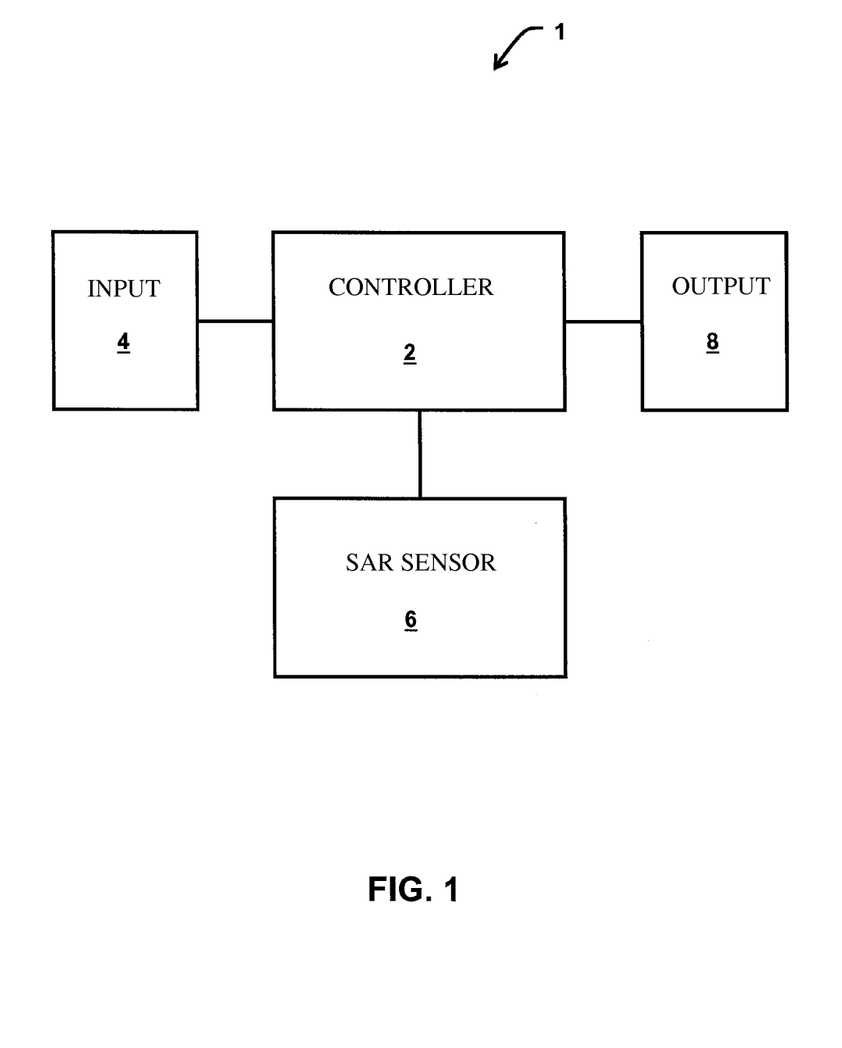
FIG. 1 is a schematic illustration of a system for processing variance ratios of SAR imagery.

FIG. 1 is a schematic illustration of an embodiment of a system 1 for processing variance ratios of SAR imagery that may be employed to implement embodiments of methods of processing variance ratios of SAR imagery. The system 1 for processing variance ratios of SAR imagery comprises a controller 2, an input 4 coupled to the controller 2, a SAR sensor 6 coupled to the controller 2, and an output 8 coupled to the controller 2.

In operation, the input 4 is used to allow user or system inputs, such as parameters and a false-alarm rate, to be input to the controller 2. SAR data of a scene is collected by the SAR sensor 6 and forwarded to the controller 2. The output 8 operates to output processed data, such as thresholded images, or variance ratio probabilities, from the controller 2. Apparatus, including the controller 2, for implementing the above described system 1 for processing variance ratios of SAR imagery, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media. The SAR sensor 6 may be any conventional SAR sensor such as an X, L, P or C band instrument mounted on an airborne or spaceborne platform, for example the DLR ESAR or the Selex-Galileo PicoSAR airborne instruments or the TerraSAR-X spaceborne instrument.

Figure 2:
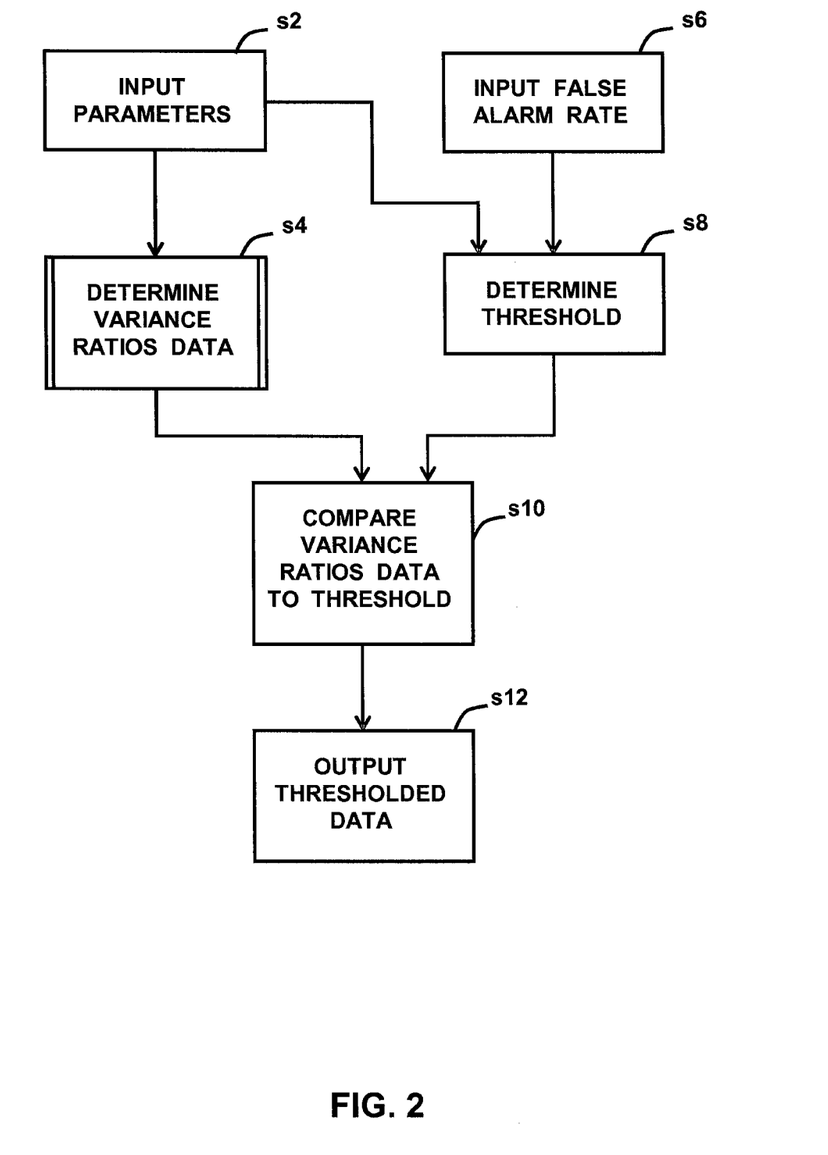
FIG. 2 is a process flowchart showing certain steps of a method of processing variance ratios of SAR imagery.

FIG. 2 is a process flowchart showing certain steps of an embodiment of processing variance ratios of SAR imagery. At step s2, parameters are input into the controller 2 via the input 4. The parameters may be determined, i.e. set, by a human operator, or may be produced automatically or semi-automatically. Any suitable variance ratio and SAR imagery parameters may be input, for example the number looks, and/or the window size used to average over a target it is intended to detect.

At step s4, variance ratios data is determined. This entails SAR image data acquisition by the SAR sensor 6 and processing thereof by the controller 2. Further details of this step are described later below with reference to FIG. 3.

Separate to steps s2 and s4, at step s6 the false alarm rate is input into the controller 2 via the input 4. The false alarm rate is a false alarm rate that is to be tolerated as part of the detection process. The false alarm rate may be determined, i.e. set, by a human operator, or may be produced automatically or semi-automatically.

Separate to step s4, at step s8, the detection threshold is determined by the controller 2, taking account of the parameters input at step s2 and the false alarm rate input at step s6. In this embodiment, the detection threshold t is derived from the desired false alarm rate $P_{fa}$ according to the equation $$t = F^{-1}\left(\frac{p_{fa}}{2} \,\middle|\, \frac{N-1}{\varphi(L,N)}, \frac{N-1}{\varphi(L,N)}\right)$$

where $F^{-1}(\cdot)$ is the inverse cumulative density function of the F-distribution (i.e. the F-distribution of the value of the function of ratio of variances for each pixel or local area window). The F-distribution is also known as Snedecor's F distribution or the Fisher-Snedecor distribution. This equation, and the various terms therein, are further defined and described later below, where further analysis derived by the present inventor is provided. It will be appreciated that in other embodiments, variations on this equation, or indeed different equations, may be derived and used by the skilled person that nevertheless draw on the insight and discussion provided below in that analysis.

At step s10, the variance ratios data provided by step s4 is compared to the threshold determined at step s8, to provide thresholded data. The variance ratios data is in effect an image of ratio values, and in this embodiment, by comparing this to the threshold, a thresholded image is provided, i.e. an image (of variance ratios) of a scene in which areas where the variance ratio is above the threshold (or below depending on how threshold is expressed) are highlighted on the thresholded image.

At step s12, this thresholded data (in this embodiment in the form of a thresholded image) is output from the controller 2 via the output 8.

Figure 3:
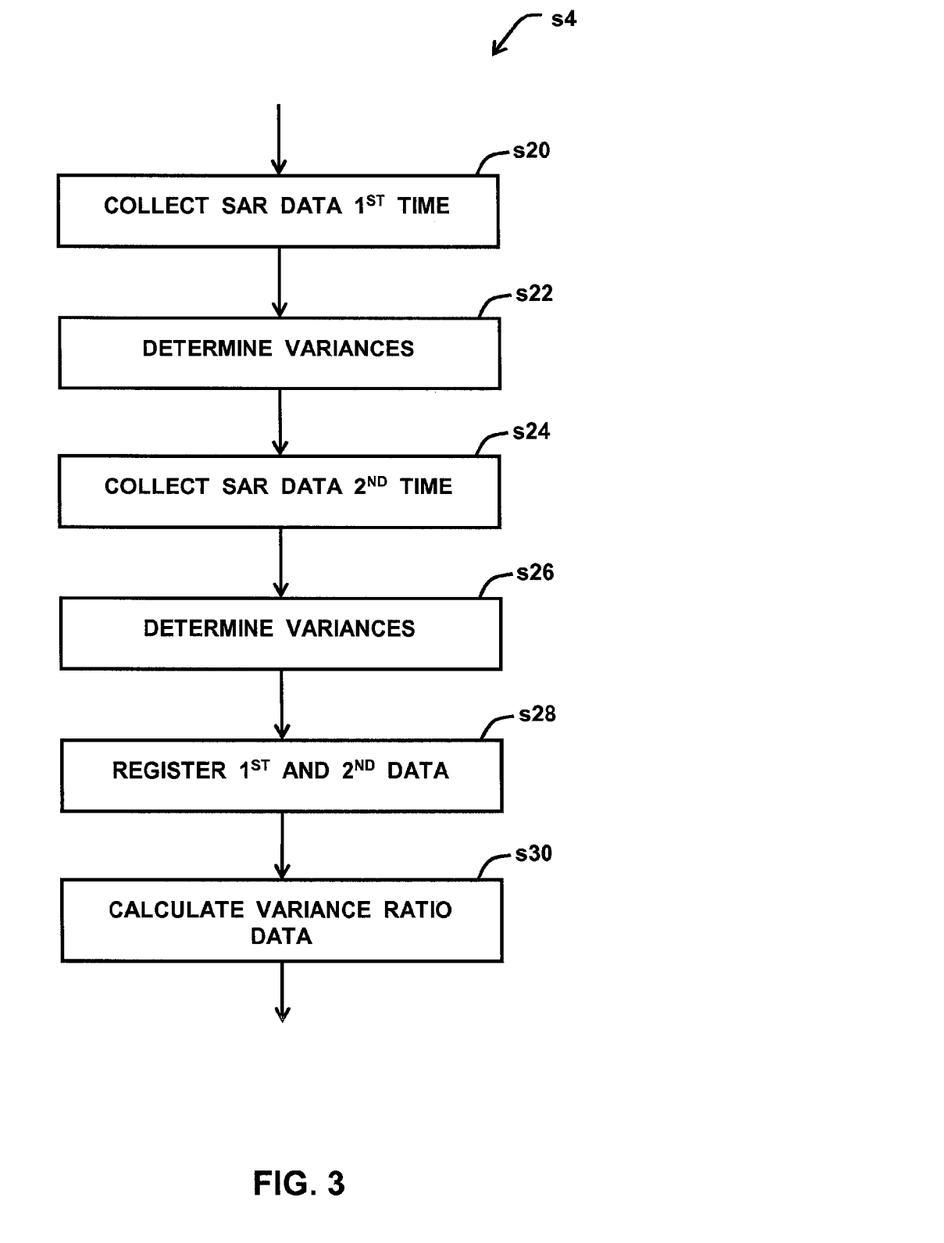
FIG. 3 is a process flowchart showing certain steps involved in one of the steps of the method of FIG. 2.

FIG. 3 is a process flowchart showing certain steps involved in the above mentioned process of step s4 of determining variance ratios.

At step s20, SAR image data is collected. For convenience of explanation, this will be termed collected for the first time however it will be appreciated that this is to differentiate with later data collections, and does not necessarily mean this is the first SAR data acquisition in any absolute sense. The SAR image data is sensed by the SAR sensor 6 and forwarded to the controller 2 in conventional fashion. For example, the SAR sensor may be mounted on an aircraft that is passing over a given area of interest, i.e. scene for which an image is sensed/captured.

At step s22, the controller 2 determines variances for the SAR image data collected at step s20, i.e. for the first SAR image data. This is implemented in conventional fashion. For example, by defining local area windows, the variance at each local window is determined. This may be carried out for each image pixel utilising pixels from their neighbourhood, or may be on some other basis.

At step s24, SAR image data is again collected. For convenience of explanation, this will be termed collected for the second time, however it will be appreciated that this is to differentiate with the earlier "first" data collection, and does not necessarily mean this is the second SAR data acquisition in any absolute sense. Again, the SAR image data is sensed by the SAR sensor 6 and forwarded to the controller 2 in conventional fashion. The data is acquired for the same, or an overlapping, area as the area of interest, i.e. scene, for which the first SAR image data was collected in at step s20.

At step s26, the controller 2 determines variances for the SAR image data collected at step s24, i.e. for the second SAR image data. This is implemented in the same fashion as was used at step s22 for determining variances for the first SAR image data.

At step s28, the first and second SAR image data is registered, e.g. registered so that the respective scenes of interest cover the same area of ground. This is implemented in conventional fashion.

At step s30, variance ratios data is calculated. This is implemented in conventional fashion. For example, for each pixel variance or for each local area window variance, the value of that pixel variance in the first SAR image data is calculated as a ratio of the value of that pixel variance in the second SAR image data. By performing this for each pixel variance value (or at least a plurality of pixel variance values, or for each local area window variance or at least a plurality of local area window variance values), the variance ratios data is in effect, in this embodiment, an image of ratio values at given points in the scene.

In conventional fashion, the processes of steps s20 to s30 make use of the parameters input at step s2.

The above described steps s20 to s30, and indeed step s2, are conventional, and it will be appreciated that in other embodiments they may be varied, including the order in which they are carried out, further including that one or more of the steps may be performed in parallel or at least overlapping temporally to some extent. Furthermore, it will be appreciated that in yet further embodiments, any appropriate conventional process may be employed for setting/inputting parameters, acquiring SAR image data, and determining therefrom variance ratios data.

The process then proceeds to step s10, as described above with reference to FIG. 2.

Figure 4:
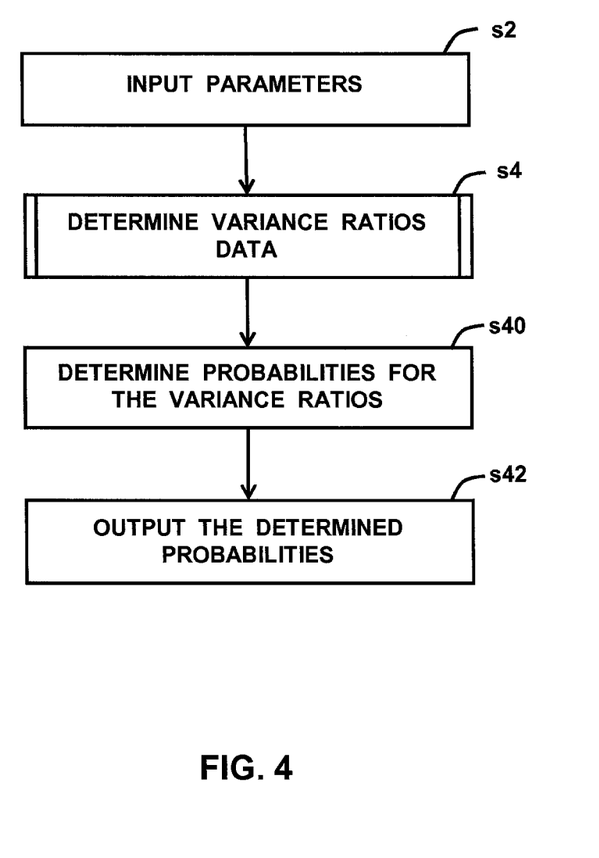
FIG. 4 is a process flowchart showing certain steps of a further method of processing variance ratios of SAR imagery.

FIG. 4 is a process flowchart showing certain steps of a further embodiment of processing variance ratios of SAR imagery. At step s2, parameters are input into the controller 2 via the input 4.

At step s4, variance ratios data is determined.

These steps s2 and s4 are performed the same way as in the process described above with reference to FIG. 2.

At step s40, probabilities are determined for the variance ratio values of the variance ratios data provided by step s4. The variance ratios data comprises ratio values for each pixel variance or each local area window variance (or at least a plurality of pixel variance values or at least a plurality of local area window variance values). In this embodiment, a probability is determined for each pixel or each local area window (or at least a plurality of pixels or at least a plurality of local area windows). The probability p-value determined is that of the relevant variance ratio value having been observed, in the event of no true change or target having become present in the second SAR image data compared to the first SAR image data (or vice-versa). The probabilities may be calculated and expressed in any appropriate form, for example as densities or as accumulative probabilities. In this embodiment, the detection probabilities are derived from the variance ratio values according to the equation $$p = 2F\left(r \left| \frac{N-1}{\varphi(L,N)}, \frac{N-1}{\varphi(L,N)}\right.\right)$$

It is noted that, as in the first embodiment described earlier above, use is made of the F-distribution (i.e. the F-distribution of the value of the function of ratio of variances for each pixel or local area window). This equation, and the various terms therein, are further defined and described later below, where further analysis of the use by the present inventor of the F-distribution is provided. It will be appreciated that in other embodiments, variations on this equation, or indeed different equations, may be derived and used by the skilled person that nevertheless draw on the insight and discussion provided below in that analysis.

In overview, in this embodiment, a function of ratio is applied to individual pixel variances (or individual local area window variances) to determine a probability for individual pixel variances (or individual local area window variances). This may therefore be considered as a corresponding but nevertheless inverse approach to that employed in the embodiment described earlier above with reference to FIG. 2 in which a probability (false alarm rate) is used to determine a threshold.

At step s42, the determined probabilities are output from the controller 2 via the output 8.

We now turn to the above mentioned further analysis of the use by the present inventor of the test for ratios of variance, and also to further details and discussion of the above embodiments and other possible embodiments.

Introduction (of Above Mentioned Further Analysis)

The above embodiments employ various implementations of Automatic Target Detection (ATD) algorithms, based on change detection, provided for application to Synthetic Aperture Radar (SAR) imagery. The algorithms advantageously tend to be tunable to detect small targets which might cover a broad range of sizes from a few pixels through to perhaps a few hundred pixels. As such, the detector might potentially be configured to detect very small objects through to larger vehicle-sized objects, depending on sensor resolution.

Change detection applications can take many forms. In some applications, such as Battle Damage Assessment (BDA), it is generally known when and where change should have taken place. Hence data collection may be scheduled for a short time before and after the event, and change assessment targeted in such a way that changes may be optimally identified. Embodiments of the present invention can be used to address the problem of initial target detection by change. In this application it is not known exactly when or where changes would occur. Therefore, the approach makes an assumption that the changes of interest occur between the dates and times of acquisition, but that no other significant changes are likely to happen within this timeframe. When looking for the types of target of interest this assumption will inevitably lead to compromises in the detection performance. Where the image pair is collected over a short time period the changes may have yet to occur; conversely, where the collection spans a long time, changes due to the natural environment (infrastructure changes, vegetation growth, etc.) may themselves overwhelm the process.

The embodiments described herein are advantageously used following the establishment of a baseline state and in a mode of operation in which, for example, regular (e.g., daily) over-flights of a region (roadway, desert track, etc.), are made to reaffirm the baseline state for the selected time period. The detection process itself preferably allows any changes identified to be highlighted for detailed interpretation by an analyst and in-field assessment where necessary. It is preferable that over-flights are scheduled to be carried out at a tempo to suit both environmental and human-induced changes in the imagery.

The embodiments described herein are based at least in part on a knowledge and exploitation of the statistical properties of SAR imagery. It is the opinion of the inventor that better and faster algorithm performance typically results where more information regarding the imaging process can be assumed. An advantage of SAR over other sensing modalities is that this process is well understood and very tightly controlled, so advantageously the present inventor makes use of this in the embodiments described herein. As such, the embodiments described herein tend to advantageously exploit the underlying statistical properties of the imagery.

The embodiments described herein use a variance ratio approach between previously registered SAR images (or such registration can take place as part of the embodiment). The variance of the detected image is determined, e.g. for a small window covering the test region, in each image in the pair. In some embodiments the ratio of the two variances is computed and its value tested against a threshold, determination of the threshold being based on a preselected or determined probability of false alarm. This will tend to allow use as a Constant False Alarm Rate detector.

The false alarm rate analysis carried out by the present inventor is based in part on the inventor noticing the surprising observation that, in Monte-Carlo trials, the distribution of the variance ratio statistic appeared to display a close match to the F-distribution. The form of the distribution is derived in the knowledge that the ratio of variance of Gaussian random variables has an F-distribution and that the Gamma distributed variables found in SAR imagery will converge to the Gaussian form at extremes of their parameterisation. Away from these extremes it is noted that the F-distribution may also be applied, but using a slightly altered parameter set. The inventor herein derives an empirical functional form for the alterations to the parameters. This leads to an appropriate statistical test that can be applied for a range of useful parameterisations of test window size and image number of looks.

Embodiments, using thresholds derived from the false alarm analysis, have been applied to archive image examples. Results produced using a registered image pair of an airfield and surrounding infrastructure, with a small number of easily identified changes over a small time interval, show the method is capable of generating a good performance on appropriate change imagery.

The following section (entitled "Statistical Change Detection") discusses the change detection approach and introduces the variance ratio method. The section thereafter (entitled "Constant False Alarm Rate Detection for Variance Ratios") discusses the false alarm rate performance for the statistics of interest and derives the form and parameterisation of an empirical correction formula such that thresholds matching the pre-set false alarm rates may be approximated.

Statistical Change Detection

The change detection processes discussed here are based on a hypothesis testing methodology with:
   a null hypothesis in which there is no change between the images; and
   an alternate hypothesis that change has taken place.

The change detection approach described here is based on local-area types of operation. These approaches often extract the training statistics for the image pair from a small region surrounding a central test area. There may be a gap, or guard region, between the training and test areas and the test area itself may be made up of a number of pixels. The method examined here effectively has the training region in one image and the test region in the other. In each image the variance is collected in a region of N pixels local to the test area. It is common for the region from which the pixels are harvested to be a square or circular region surrounding a given test point, and for the test point to be traversed throughout the whole image until all pixels are included.

A change detector for amplitude or power SAR image pairs may be constructed using the variance ratio, along the lines of the technique described in the reference Kaplan, L. M., "Improved SAR Target Detection via Extended Fractal Features", IEEE Trans. Aerospace and Electronic Systems, Vol. 37, No. 2 Apr. 2001. This is based on the observation that, in SAR imagery at least, the pixels of man-made target objects tend to show a more spiky speckle structure than those of discrete clutter objects. The spikiness is captured, to some extent, by the variance operator and can be compared by taking the ratio of the measurements. Therefore the raw variance ratio statistic is $$r = \begin{cases} \hat{R}, & \text{if } \hat{R} \leq 1 \\ \hat{R}^{-1}, & \text{if } \hat{R} > 1 \end{cases}$$

where $$\hat{R} = \frac{\text{var}_{1 \ldots N}(|f|^2)}{\text{var}_{1 \ldots N}(|g|^2)}.$$

Where the variance is collected over the N pixels local to the test area as discussed above, $|f|^2$ are the detected pixels of the first image, whilst $|g|^2$ are the detected pixels of the second image. This is similar in definition to the RCS ratio considered in the reference Touzi, R., Lopes, A., Bousquet, P., "A Statistical and Geometrical Edge Detector for SAR Images", IEEE Transactions on Geoscience and Remote Sensing, Vol. 25, No. 6, pp. 764-773, 1988. The use of the variance of the detected imagery in the ratio statistic leads to a complicated statistical interpretation. The development of this approach within a Constant False Alarm Rate (CFAR) type operator is discussed in the following section.

Constant False Alarm Rate Detection for Variance Ratios

The reference Oliver, C., Quegan, S., "Understanding Synthetic Aperture Radar Images", SciTech Publishing Inc., 2004 presents (p. 96, p. 130, 2004) a multiplicative "noise" model for speckle in SAR imagery, casting the observed pixel intensity I as the product I=σn in which σ is the deterministic Radar Cross Section (RCS) at the point of measurement multiplied by a unit mean speckle component. For single look imagery the speckle component n is exponentially distributed, whilst for multi-look imagery (with L looks) the following Gamma density applies $$g(n) = \frac{L^L n^{L-1}}{\Gamma(L)} \exp(-Ln).$$

That is, a standard Gamma distribution with shape parameter L and scale parameter 1/L which will give a mean of 1 and variance of 1/L. This probability density function (pdf) therefore highlights the advantage of multi-looking as a means of reducing the effects of speckle. The inventor has also alighted on the known fact that as the shape parameter becomes large the Gamma distribution tends to a Gaussian distribution.

Distribution of Raw Ratio Statistic

We begin by considering the raw ratio of variances $\hat{R}$. We are interested in the ratio of the variance of a collection of pixels with the above distribution. In addition to the assumption of no change stated above we will assume that:
   image pixels are independent;
   the region over which the variances are collected is homogeneous, and;
   the regions over which the variances are calculated are of the same size and shape.

These assumptions modify the earlier ratio equation such that $$\hat{R} = \frac{\sigma^2 \text{var}(n_1)}{\sigma^2 \text{var}(n_2)}$$

where $n_1$ is the speckle component from the first image and $n_2$ is the speckle component from the second image. Clearly, under this null hypothesis, the RCS components cancel, hence the ratio statistics are dependent on the speckle only.

If the speckle were to have a Gaussian distribution then it is known that $\hat{R}$ would have an F-distribution such that if $$\hat{R} = \frac{s_1}{s_2},$$

where $s_1$ is the unbiased sample variance from image 1 with sample size $N_1$ and $s_2$ is the unbiased sample variance from image 2 with sample size $N_2$, then $$\hat{R} \sim F(v_1 = N_1 - 1, v_2 = N_2 - 1)$$

where $v_1$ and $v_2$ are the degrees of freedom of the F-distribution. As stated above our regions are of equal size so $v_1 = v_2 = N - 1$.

Unfortunately the pixels are not Gaussian, however, the inventor has considered that as the distribution of the speckle tends to Gaussian as L is increased it would be interesting to consider whether the F-distribution might also be adapted for use for the Gamma distributed speckle.

There is a known process to simulate speckle from the Gamma distribution with varying numbers of looks. The variances of the simulated values may then be extracted for a range of sample sizes and ratios found in order to examine the distribution of the raw ratio statistic. Quantile-Quantile (QQ) plots are used to compare the distribution of the simulated data with theoretical distributions. Initial examination of a set of QQ plots suggests that if a factor φ is applied to the degrees of freedom $v_1(=v_2)$ parameter this will allow adjustment of an F-distribution to enable a match to the ratio of variance of Gamma distributed data.

In order to investigate this further an extensive set of trials was carried out by the inventor, which synthesised large samples of $\hat{R}$ values for a range of settings of the number of looks (L) and the number of samples contributing to the variance (N). A Markov-Chain Monte-Carlo (MCMC) procedure was set up to infer, by simulation, values of φ fitting $$\hat{R} \sim F\left(\frac{N-1}{\varphi}, \frac{N-1}{\varphi}\right)$$

to each simulated set. An introduction to MCMC techniques such as that used here may be found in the reference Gilks, W. R., Richardson, S., Spiegelhalter, D. J., "Markov Chain Monte Carlo in Practice", Chapman and Hall, 1996. The MCMC process was tuned to return an acceptance ratio of between 40%-50% throughout the simulation, encouraging a good movement throughout the parameter space. After an initial very rapid burn-in period for each run, the statistics of the inferred φ values were collected.

Figure 5A:
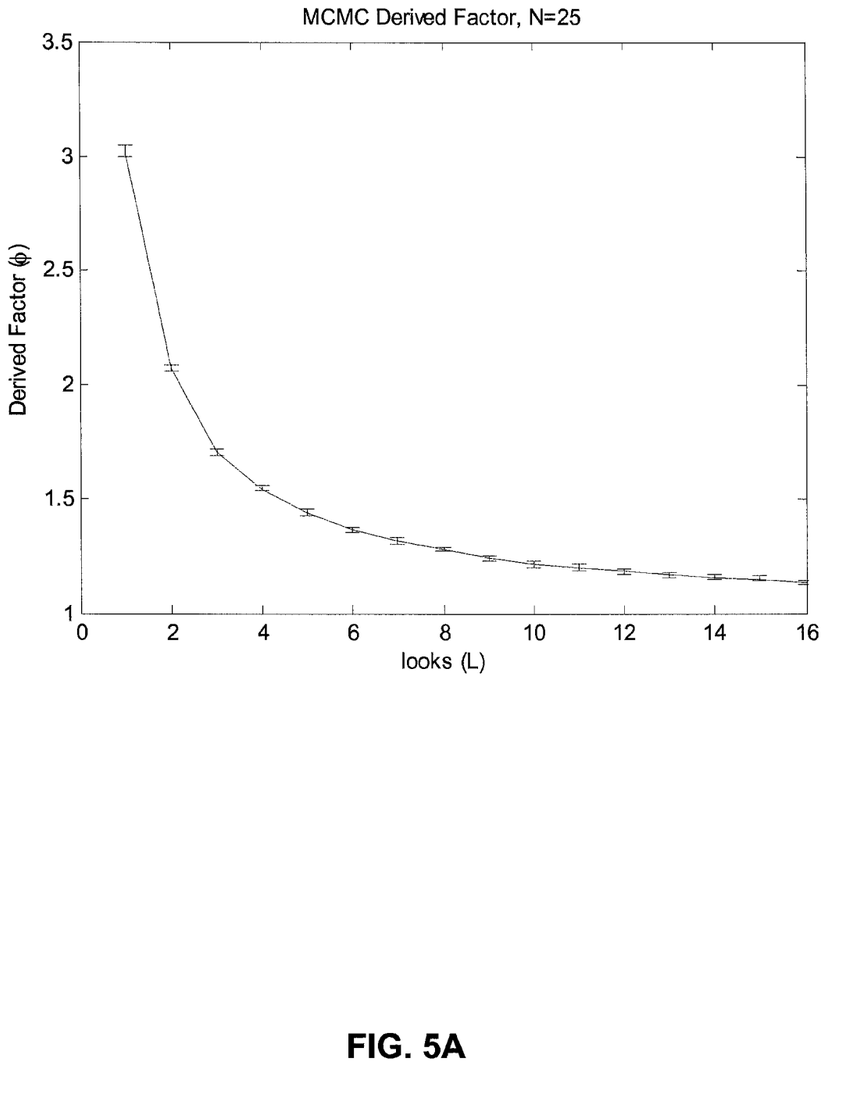
FIGS. 5A and 5B show mean and two standard deviation error bar results of inference processes for a variation in the number of looks parameter and in the window size parameter respectively.
Figure 5B:
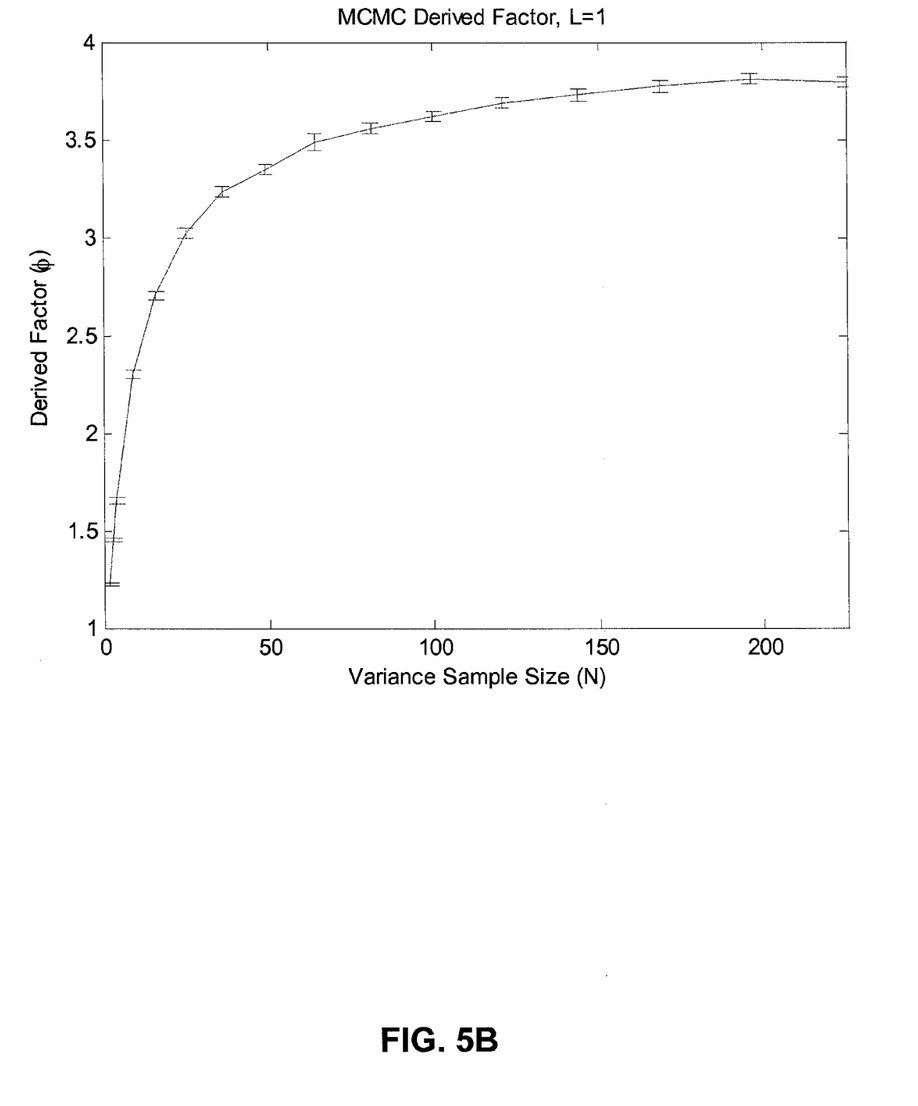

Results from this inference process are set out below, with Table 1 showing the mean φ values derived for each parameterisation. Referring also to FIGS. 5A and 5B, FIG. 5A shows the mean, along with two standard deviation error bars for the fixed variance sample size of N=25 and a varying number of looks, whilst FIG. 5B shows the mean and two standard deviation error bars for a fixed number of looks L=1 and a varying window size.

increased it appears somewhat asymptotic to some value for each setting of the number of looks parameter.

Figure 6A:
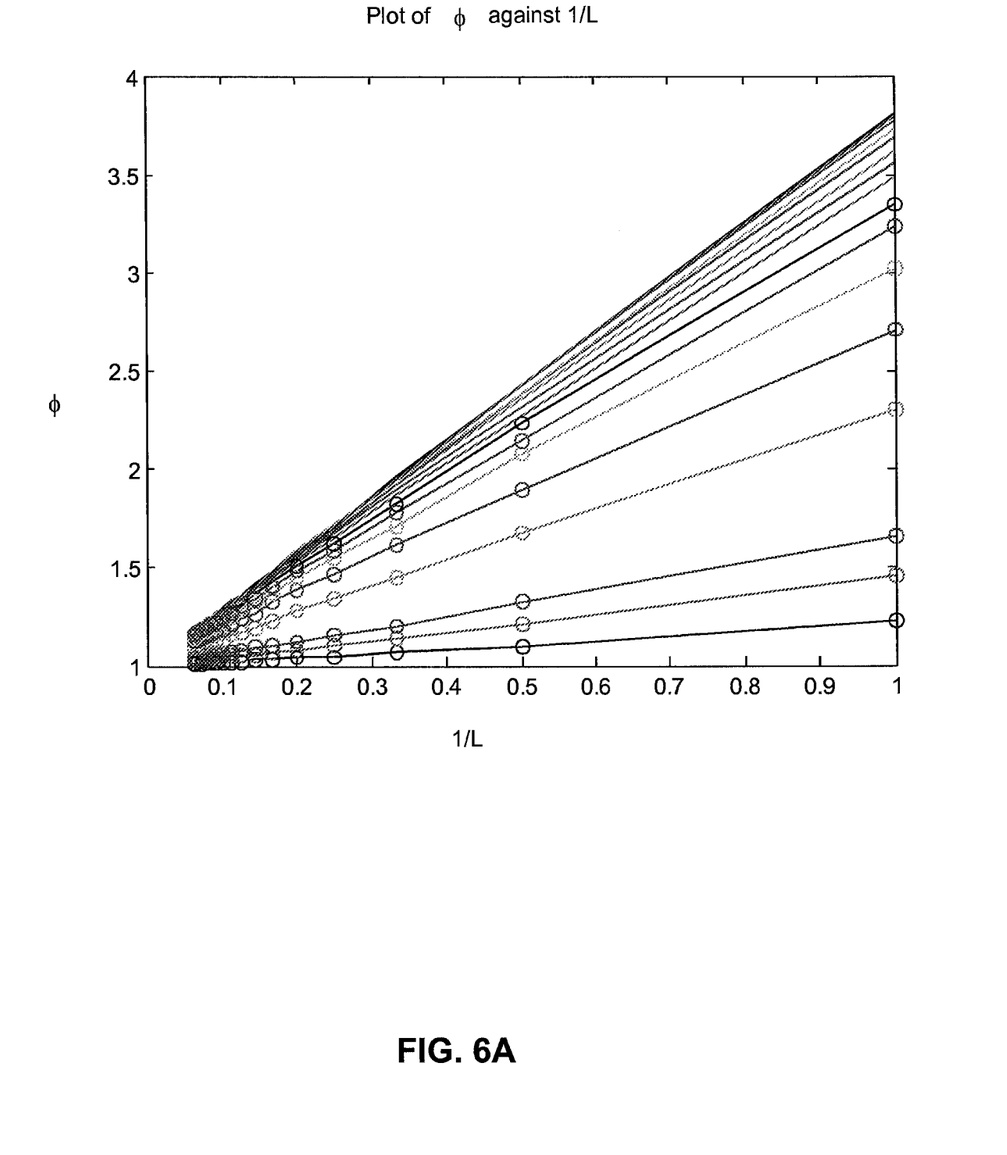
FIGS. 6A and 6B show plots related to capture of the parametric form of the derived relationship.
Figure 6B:
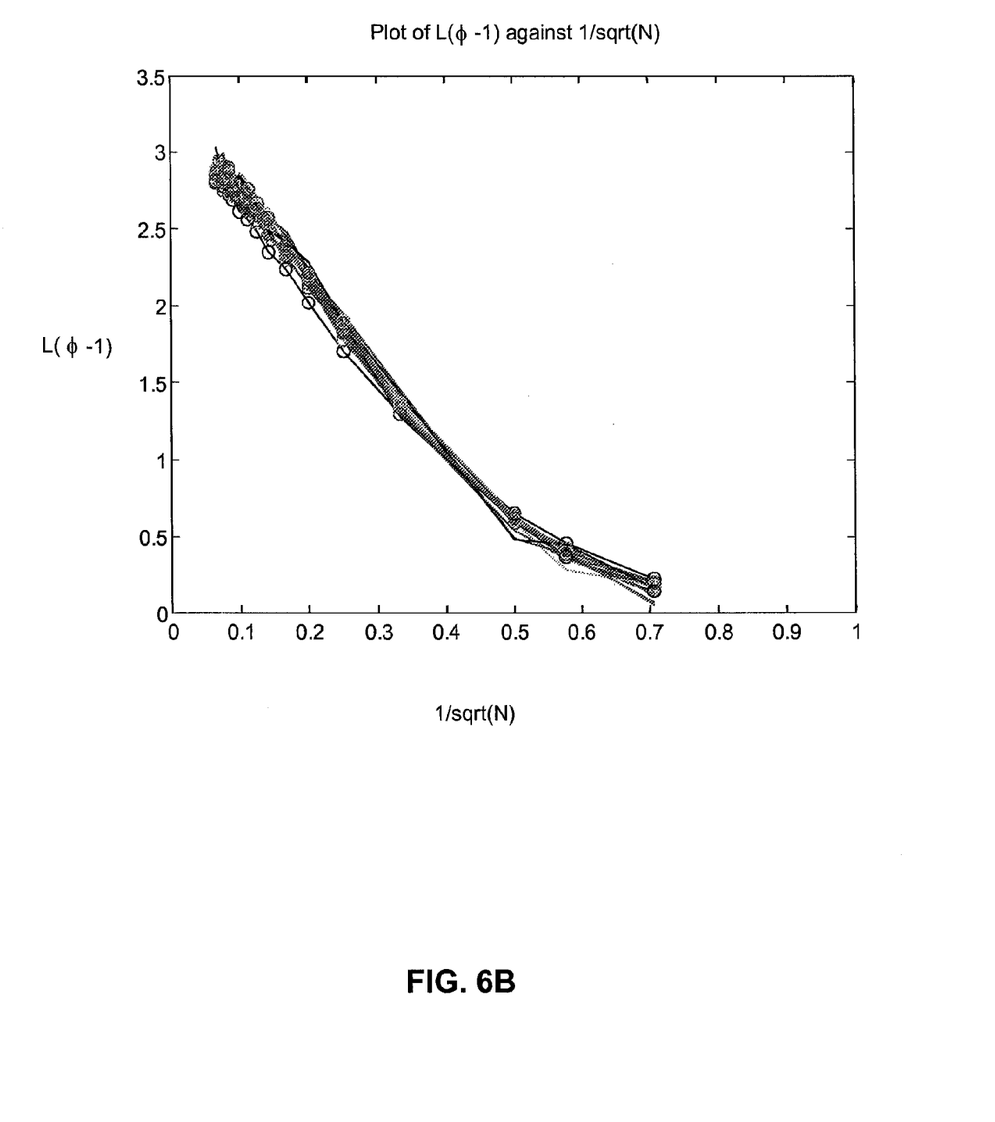

The form of FIGS. 5A and 5B suggest to the inventor a relationship between φ and the reciprocal of the number of looks. This is examined in FIG. 6A for each value of N considered (the values of N considered being 2, 3, 4, 9, 16, 25, 36, 49, 64, 81, 100, 121, 144, 169, 196, and 225). FIG. 6A shows that, for each N, the plot of φ against 1/L is approximately a straight line with intercept at least close to one. This indicates that a functional form of $$\varphi(L, N) \cong 1 + \frac{1}{L}c(N),$$

where c(N) is some function of the variance sample size only, may be appropriate. This properly converges φ→1 as L→∞. FIG. 6B attempts to further refine the form of the c(N) function by plotting L(φ−1) against $1/\sqrt{N}$ for each integer value of L from 1 to 16. Here the former was selected by consideration of the above result and the latter part was chosen after a number of abortive attempts.

This result of FIG. 6B shows nearly the same, nearly straight-line function for all values of L and N considered. This observation suggests the following functional form might be sufficient for the representation, $$\varphi(L, N) \cong 1 + \frac{1}{L}\left(a - \frac{b}{\sqrt{N}}\right).$$

Figure 7:
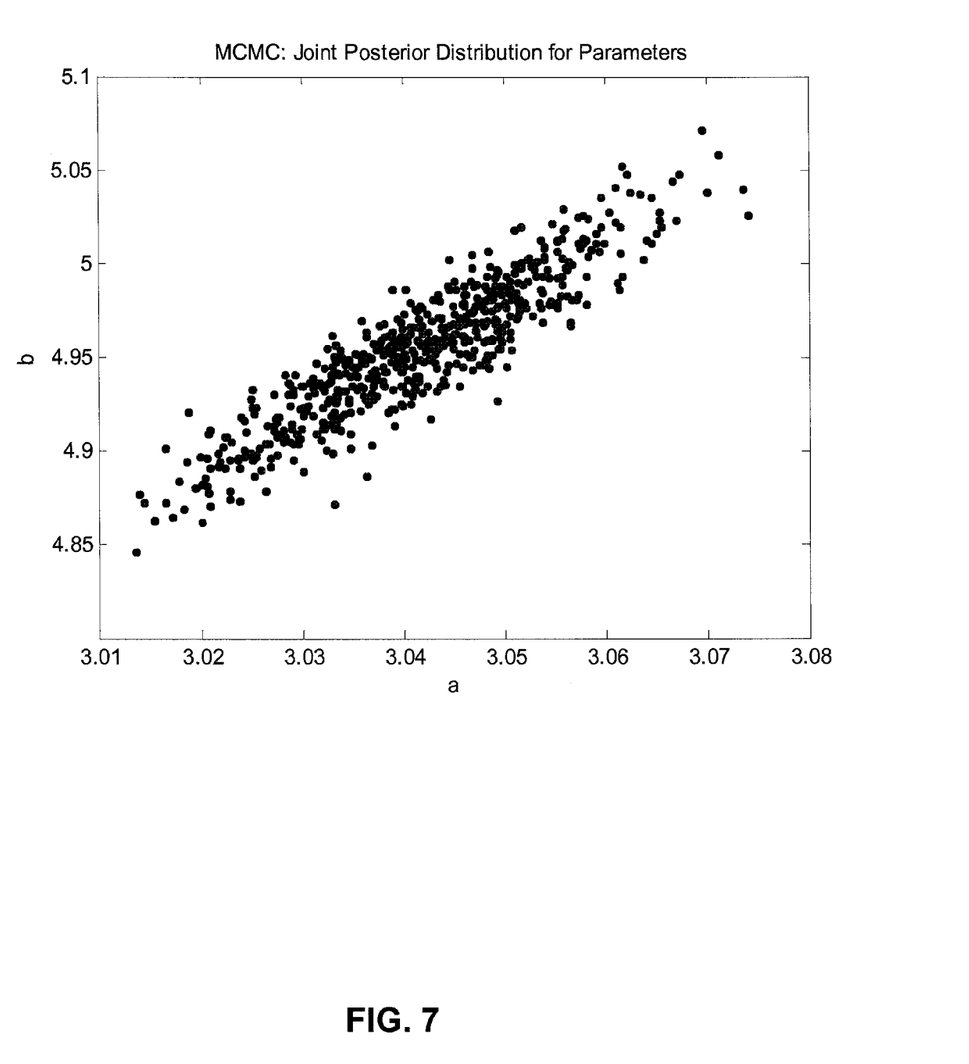
FIG. 7 shows results for a post burn-in subset from an inference process capturing parameter values.

A second MCMC based process was designed to infer the values of a and b using a sample set of a million synthesised data points covering a range of values for the number of looks and the variance window size. The Markov-Chain was run for 17,500 iterations. Results for a post burn-in subset are shown in FIG. 7. This result highlights the joint distribution of the pair of function parameters. Inspection of FIG. 7 suggests sensible values for the parameter pair are a=3.04 and b=4.95.

Figure 8A:
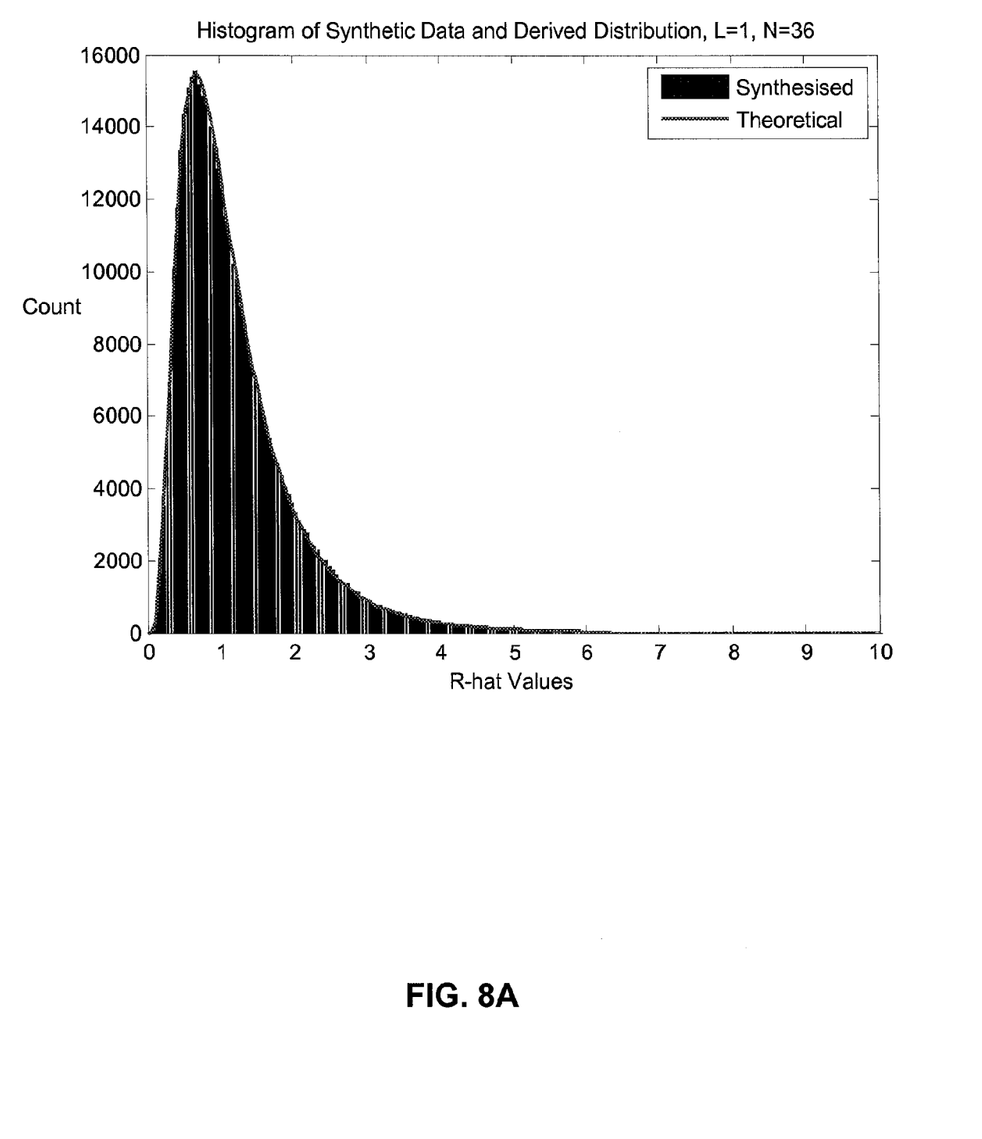
FIGS. 8A and 8B show histograms of synthesised raw ratio values and probability density curves.
Figure 8B:
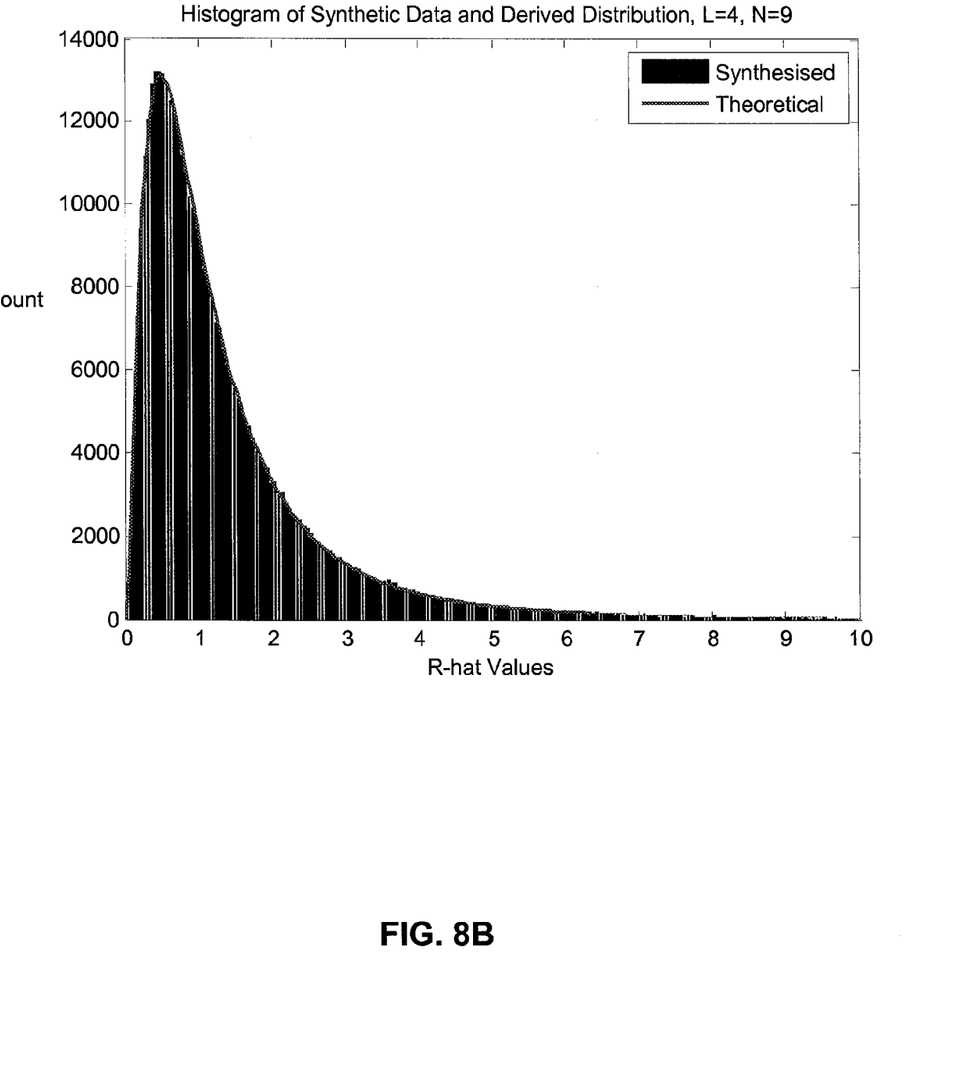

A final result for this discussion presents histograms of synthesised raw ratio values and probability density curves

TABLE 1

Mean φ values for a range of variance window sizes (N) and image looks (L)

| | | Number of Looks, L | | | | | | | | | | |
|---|---|---|---|---|---|---|---|---|---|---|---|---|
| | | 1 | 2 | 3 | 4 | 5 | 6 | 7 | 8 | 10 | 12 | 16 |
| Variance Window Size, N | 2 | 1.22 | 1.09 | 1.07 | 1.04 | 1.04 | 1.03 | 1.03 | 1.02 | 1.02 | 1.01 | 1.00 |
| | 3 | 1.45 | 1.21 | 1.13 | 1.10 | 1.08 | 1.07 | 1.05 | 1.05 | 1.04 | 1.03 | 1.03 |
| | 4 | 1.65 | 1.32 | 1.20 | 1.15 | 1.12 | 1.10 | 1.09 | 1.07 | 1.05 | 1.05 | 1.04 |
| | 9 | 2.30 | 1.67 | 1.44 | 1.34 | 1.27 | 1.23 | 1.19 | 1.16 | 1.13 | 1.12 | 1.08 |
| | 16 | 2.70 | 1.89 | 1.61 | 1.46 | 1.38 | 1.32 | 1.26 | 1.24 | 1.18 | 1.16 | 1.12 |
| | 25 | 3.02 | 2.07 | 1.71 | 1.55 | 1.44 | 1.37 | 1.32 | 1.28 | 1.22 | 1.19 | 1.14 |
| | 49 | 3.35 | 2.23 | 1.82 | 1.62 | 1.51 | 1.42 | 1.37 | 1.31 | 1.25 | 1.22 | 1.15 |
| | 81 | 3.56 | 2.31 | 1.89 | 1.67 | 1.53 | 1.45 | 1.39 | 1.33 | 1.27 | 1.22 | 1.17 |
| | 100 | 3.62 | 2.36 | 1.91 | 1.68 | 1.55 | 1.47 | 1.39 | 1.36 | 1.26 | 1.22 | 1.18 |
| | 121 | 3.69 | 2.38 | 1.92 | 1.68 | 1.56 | 1.47 | 1.39 | 1.35 | 1.29 | 1.24 | 1.18 |
| | 169 | 3.77 | 2.43 | 1.94 | 1.70 | 1.55 | 1.48 | 1.40 | 1.36 | 1.29 | 1.23 | 1.19 |
| | 225 | 3.79 | 2.43 | 1.94 | 1.70 | 1.57 | 1.48 | 1.40 | 1.36 | 1.30 | 1.23 | 1.18 |

Both the table and the figures indicate that, as expected, the factor approaches a value of 1 as the number of looks increases. These results also show that for the smaller variance sample sizes the factor is closer to one, even for a small number of looks, but that as the variance window size is for the theoretical F-distribution derived using the above analysis for a pair of parameterisations. These are presented in FIGS. 8A and 8B with histograms shaded and the theoretical curve derived using the above procedure overlaid. The parameterisations selected for display here are among those that might be appropriate for the detection of typical vehicle size objects in high-resolution SAR imagery. In both cases a very close fit between the synthetic and derived distributions is observed (indeed the extent of the closeness of the fit leaves the distinction between the shading and the overlaid line difficult to see in the Figures). The distributions of $\hat{R}$ are for L=1, N=36, $\phi$=3.22 in FIG. 8A and for L=4, N=9, $\phi$=1.35 in FIG. 8B.

Threshold Extraction for the Applied Ratio Statistic

The above analysis has been carried out considering the raw ratio statistic $\hat{R}$. Recalling from the section entitled "Statistical Change Detection" that the applied ratio statistic $$r = \begin{cases} \hat{R}, & \text{if } \hat{R} \le 1 \\ \hat{R}^{-1}, & \text{if } \hat{R} > 1 \end{cases}$$

we can derive the threshold for this measure using the properties of the F-distribution.

It is known, for the F-distribution, that if $$X \sim F(v_1, v_2),$$

i.e., random variable X is known to follow an F-distribution with parameters $v_1$ and $v_2$ then $$\frac{1}{X} \sim F(v_2, v_1).$$

That is, the reciprocal of X will follow an F-distribution with parameters $v_2$ and $v_1$.

We note from the definition of r that a detection may be flagged if $$0 \le \hat{R} < t$$

or $$\frac{1}{t} < \hat{R} \Rightarrow 0 \le \frac{1}{\hat{R}} < t$$

for test threshold $t \le 1$. For the present implementation $v_1 = v_2$. Therefore to derive t from the desired false alarm rate $p_{fa}$ we set $$t = F^{-1}\left(\frac{p_{fa}}{2} \middle| \frac{N-1}{\varphi(L, N)}, \frac{N-1}{\varphi(L, N)}\right)$$

where $F^{-1}(\cdot)$ is the inverse cumulative density function of the F-distribution. Any regions found to have r<t are detected at the selected false alarm rate.

Probability Extraction for the Applied Ratio Statistic

The above equation can be inverted to give $$p = 2F\left(r \middle| \frac{N-1}{\varphi(L, N)}, \frac{N-1}{\varphi(L, N)}\right)$$

where the determined probability p is that of the relevant variance ratio value having been observed, in the event of no true change or target having become present in the second SAR image data compared to the first SAR image data (or vice-versa).

Simplified ("Prototype") Implementation

In an embodiment, a simplified form of processing for the variance ratio detector and the threshold setting process may be implemented by using the Matlab (Trademark) (available from MathWorks, 3 Apple Hill Drive, Natick, Mass. 01760-2098, USA) algorithm development environment. Matlab has a capability to treat whole scenes effectively as a single variable in calculations. Where it is possible to do this large data volumes may be processed using straightforward block operations, and good computational performance may be achieved through vectorisation of the operation. As an additional benefit Matlab renditions of algorithms tend to be easy to read, as the confusion often caused by indexing within the computation may typically be avoided. Matlab also has a rich library of ready-written functions in the core system or in add-in toolboxes. These functions allow some of the more complex calculations such as the accumulation of the window statistics or evaluation of special functions described above to be simply accessed through pre-calculation of the relevant quantities.

The accumulation of the window statistics makes heavy use of the Matlab smooth3 function. In one parameterisation this allows the smoothing of a three-dimensional dataset using a user-supplied convolution kernel. We simultaneously average several variables of our two-dimensional SAR image by augmenting the data, in the third dimension, with the functional values. For example, in the current application we estimate the raw moments of the registered imagery by placing the intensity component of the first image ($z_1$) in the first plane of the third dimension, its squared value ($z_1^2$) in the second plane, the intensity value of the second image ($z_2$) in the third plane, and its squared value ($z_2^2$) in the fourth plane. Convolution kernels the size of the accumulation windows (in first and second dimensions) by one (in the third dimension) will allow averaging over the window sizes for both images and for all required functions of the pixels in effectively a single step. Functions of the raw moments may then be trivially calculated for each pixel in the scene, again as vector operations. The values required here are the second central moments, which are very straightforward to extract.

It should be noted that certain of the process steps depicted in the flowcharts of FIGS. 2, 3 and 4 and described above may be omitted or such process steps may be performed in differing order to that presented above and shown in the Figures. Furthermore, although all the process steps have, for convenience and ease of understanding, been depicted as discrete temporally-sequential steps, nevertheless some of the process steps may in fact be performed simultaneously or at least overlapping to some extent temporally.

In further embodiments, the false alarm rate may be reset in an ongoing fashion based on, or based in part on, the outcome of the process of FIG. 2 being adapted to provide feedback of its results to the process of setting the false alarm rate. Additionally or alternatively, for example, the parameters employed during step s4 may be fed into an ongoing process of setting the false alarm rate and calculating the threshold. Indeed, it will be appreciated that in yet further embodiments the processes described above may be adapted to incorporate any appropriate feedback/ongoing update processes.

At step s12 this thresholded data (in this embodiment in the form of a thresholded image) is output from the controller via the output 8. In other embodiments, the thresholded data may be in forms other than a thresholded image, for example as an effective image of probabilities. The latter may be combined with probabilistic or decision-level products from other processes allowing a result to be derived which is a fusion of multiple data sources or processes.

Also, in other embodiments, the threshold may be bit averaged, or for example it may be required that all of a sufficient connected area of the image be above the threshold to be a detected potential change. More generally it will be appreciated that any appropriate conventional thresholding techniques or details may be applied when compatible with or adaptable to the above described arrangements.

The invention claimed is:

1. A method of processing SAR imagery data for automatic target detection based on change detection, the SAR imagery data comprising first SAR image data and second SAR image data, the method comprising:
    determining variance ratio data from the first SAR image data;
    determining variance ratio data from the second SAR image data; and
    determining a change detection threshold based on the F-distribution of the determined variance ratios data.

2. A method according to claim 1, further comprising selecting a desired false alarm rate; and wherein determining a change detection threshold for the determined variance ratios data includes the desired false alarm rate.

3. A method according to claim 2, wherein determining the change detection threshold based on the F-distribution comprises using the inverse cumulative density function of the F-distribution.

4. A method according to claim 3, wherein determining the change detection threshold based on the F-distribution comprises using the equation $$t = F^{-1}\left(\frac{p_{fa}}{2} \bigg| \frac{N-1}{\varphi(L, N)}, \frac{N-1}{\varphi(L, N)}\right).$$

5. A method according to claim 2, further comprising comparing the determined variance ratios data to the determined change detection threshold.

6. A method according to claim 1, wherein the determined variance ratios data is an image of ratio values.

7. A method according to claim 1, wherein the F-distribution comprises using the F-distribution to determine probabilities for the determined variance ratios data.

8. A method according to claim 7, wherein determining the probabilities using the F-distribution comprises using the equation $$p = 2F\left(r \bigg| \frac{N-1}{\varphi(L, N)}, \frac{N-1}{\varphi(L, N)}\right).$$

9. A method according to claim 7, wherein the probabilities are determined for each pixel or local area window used in the determination of the variance ratios data.

10. Apparatus arranged to process SAR imagery data for automatic target detection based on change detection, comprising:
    a controller configured to:
        receive SAR imagery data comprising first SAR image data and second SAR image data;
        determine variance ratio data from the SAR imagery data;
        determine variance ratio data from the second SAR image data; and
        determine a change detection threshold based on the F-distribution of the determined variance ratios data.

11. A machine readable storage device storing a program or plurality of programs arranged such that when executed by a computer system or one or more processors it/they cause the computer system or the one or more processors to operate in accordance with a method of processing SAR imagery data for automatic target detection based on change detection, the SAR imagery data comprising first SAR image data and second SAR image data, the method comprising:
    determining variance ratio data from the first SAR imagery data;
    determining variance ratio data from the second SAR image data; and
    determining a change detection threshold based on the F-distribution of the determined variance ratios data.

* * * * *